(12) United States Patent
De Felice

(10) Patent No.: US 10,788,233 B2
(45) Date of Patent: Sep. 29, 2020

(54) DYNAMIC HVAC MACHINE ROOM SETPOINT COMPUTATION

(71) Applicant: Schroff Technologies International, Inc., North Kingstown, RI (US)

(72) Inventor: Richard De Felice, Califon, NJ (US)

(73) Assignee: Schroff Technologies International, Inc., North Kingston, RI (US)

( * ) Notice: Subject to any disclaimer, the term of this patent is extended or adjusted under 35 U.S.C. 154(b) by 115 days.

(21) Appl. No.: 16/029,354

(22) Filed: Jul. 6, 2018

(65) Prior Publication Data

US 2019/0137130 A1    May 9, 2019

Related U.S. Application Data

(60) Provisional application No. 62/529,417, filed on Jul. 6, 2017.

(51) Int. Cl.
*F24F 11/46* (2018.01)
*F24F 11/58* (2018.01)
(Continued)

(52) U.S. Cl.
CPC .............. *F24F 11/46* (2018.01); *F24F 11/58* (2018.01); *F24F 11/61* (2018.01); *F24F 11/64* (2018.01); *F24F 11/67* (2018.01); *G05B 19/0426* (2013.01); *F24F 11/80* (2018.01); *F24F 2110/10* (2018.01); *F24F 2110/12* (2018.01);
(Continued)

(58) Field of Classification Search
CPC .. F24F 11/46; F24F 11/58; F24F 11/61; F24F 11/64; F24F 11/67; F24F 11/80; F24F 2110/10; F24F 2110/12; F24F 2140/50; F24F 2140/60; F24F 2221/54; G05B 19/0426; G05B 2219/2614
See application file for complete search history.

(56) References Cited

U.S. PATENT DOCUMENTS

| | | | | | |
|---|---|---|---|---|---|
| 4,669,427 | A | * | 6/1987 | Shimonosono | F01P 3/2285 123/41.27 |
| 4,901,917 | A | * | 2/1990 | Littell, III | F23N 1/002 165/239 |

(Continued)

FOREIGN PATENT DOCUMENTS

JP         60129544 A  *  7/1985

*Primary Examiner* — Chun Cao
(74) *Attorney, Agent, or Firm* — Armis IP Law, LLC

(57) ABSTRACT

An HVAC (Heating, ventilation and air-conditioning) system for a machine room enclosure monitors the cycle time between powered-on and powered off intervals of a temperature controlled environment in the enclosure. Activation of a cooling unit occurs based on a computed time for attaining a cooling satisfaction threshold and an idle time until cooling is again called for based on a cooling demand threshold. Activation is adjusted based on a duration of the cycle times to avoid an excessive duration or brevity that imposes a strain on the cooling unit. The cooling demand and satisfaction thresholds are adjusted up or down to moderate the activated and idle cycle time. Additional adjustments are made for aged equipment that may be less efficient and more susceptible to strain from excessive cycling, and for extreme ambient temperatures that impose a greater burden and which may require additional time for reducing enclosure temperature.

17 Claims, 3 Drawing Sheets

(51) Int. Cl.
　　　*F24F 11/61* 　　(2018.01)
　　　*F24F 11/64* 　　(2018.01)
　　　*F24F 11/67* 　　(2018.01)
　　　*G05B 19/042* 　(2006.01)
　　　*F24F 11/80* 　　(2018.01)
　　　*F24F 110/10* 　(2018.01)
　　　*F24F 110/12* 　(2018.01)
　　　*F24F 140/50* 　(2018.01)
　　　*F24F 140/60* 　(2018.01)

(52) U.S. Cl.
　　CPC ....... *F24F 2140/50* (2018.01); *F24F 2140/60* (2018.01); *F24F 2221/54* (2013.01); *G05B 2219/2614* (2013.01)

(56) References Cited

U.S. PATENT DOCUMENTS

| | | | | |
|---|---|---|---|---|
| 6,402,043 | B1* | 6/2002 | Cockerill | G05D 23/1919 165/11.1 |
| 2013/0013118 | A1* | 1/2013 | Merkulov | G05D 23/1902 700/286 |
| 2017/0038109 | A1* | 2/2017 | De Felice | F24F 11/30 |
| 2017/0356668 | A1* | 12/2017 | Goel | F25B 49/022 |

* cited by examiner

DYNAMIC HVAC MACHINE ROOM SETPOINT COMPUTATION

RELATED APPLICATIONS

This patent application claims the benefit under 35 U.S.C. § 119(e) of U.S. Provisional Patent App. No. 62/529,417, filed Jul. 6, 2017, entitled "DYNAMIC HVAC MACHINE ROOM SETPOINT COMPUTATION," incorporated herein by reference in entirety.

BACKGROUND

Machine rooms and enclosures for telecommunications and other computing equipment have specialized ventilation needs due to the heat generated as a byproduct of operation. Such enclosures are typically only as large as necessary to house the corresponding equipment, and are therefore prone to heat buildup if not adequately cooled or ventilated. Conventional approaches outfit these enclosures with air conditioning systems to offset the heat gain, however are often only equipped to generate an alarm in the event of equipment malfunction. Failure of the native AC system presents problems of overheated equipment and downtime until maintenance personnel can be notified and transported to the failed system location.

SUMMARY

An HVAC (Heating, ventilation and air-conditioning) system for a machine room enclosure monitors the cycle time between powered-on and powered off intervals of a cooling unit providing a temperature controlled environment in the enclosure. Activation of the cooling unit occurs based on a computed time for attaining a cooling satisfaction threshold and an idle time until cooling is again called for based on a cooling demand threshold. Activation is adjusted based on a duration of the cycle times to avoid an excessive duration or brevity that imposes a strain on the cooling unit. The cooling demand and satisfaction thresholds are adjusted up or down to moderate the activated and idle cycle time. Additional adjustments are made for aged equipment that may be less efficient and more susceptible to strain from excessive cycling, and for extreme ambient temperatures that impose a greater burden and which may require additional time for reducing enclosure temperature.

Configurations herein are based, in part, on the observation that machine room enclosures for electronic equipment such as telecommunications and networking equipment require HVAC systems to offset both the ambient outside temperatures and the heat generated by the electrical equipment itself. Such enclosures may be frequently unattended, yet are relied upon for maintaining a substantial equipment investment. Unfortunately, conventional approaches to machine enclosure environments suffer from the shortcoming that conventional HVAC control systems are not responsive to cycle time of the HVAC equipment (typically cooling units), and may result in excessive cycling for either extremely short or extensive time, both which place undue strain on the HVAC equipment. Accordingly, configurations herein substantially overcome the cycling propensity of conventional controls by providing a time component to the setpoint thresholds to modify the setpoints based on powered-on and powered-off times to prevent extreme variations in operating duration.

Further, conventional approaches relying purely on temperature typically incorporate multiple sensors disposed throughout the conditioned environment. Various temperature measurement locations may be included, such as at the evaporator exit, exhaust exit, evaporator intake, various walls, and other locations. Multiple sensors increase the likelihood of sensor malfunction or confusion, as when maintenance efforts result in removal and possible improper reinstallation of sensors. Further, physical conditions, such as a machine rack obscuring an evaporator output, can result in acceptability of some readings (i.e. evaporator exit), while imbalanced "hot spots" exist. Observation and monitoring of cooling unit runtime gives a more results-oriented perspective to proper equipment health.

While conventional approaches may employ time factors for purposes such as compressor delay once a setpoint (demand or shutoff) is attained, conventional approaches do not modify the setpoint based on the cycle length. The former adjusts compressor runtime after the setpoint has been achieved; the latter proactively changes the setpoint before it is triggered, as discussed further below.

In further detail, the disclosed method of controlling HVAC units in an equipment enclosure includes controlling a cooling unit by activating the cooling unit based on a time needed to effect a quantum of a temperature change in the enclosure during a previous measured interval of activation. In an environmentally controlled enclosure having HVAC units responsive to power cycling for achieving operational temperatures defined by a plurality of setpoints, control logic in a controller regulates environmental conditions in the enclosure by determining a time when a cooling unit is powered on in response to a setpoint, and determining a time when the cooling unit is powered off in response to a setpoint. The controller then adjusts at least one of the setpoints based on a difference between the powered-on time and the powered-off time.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
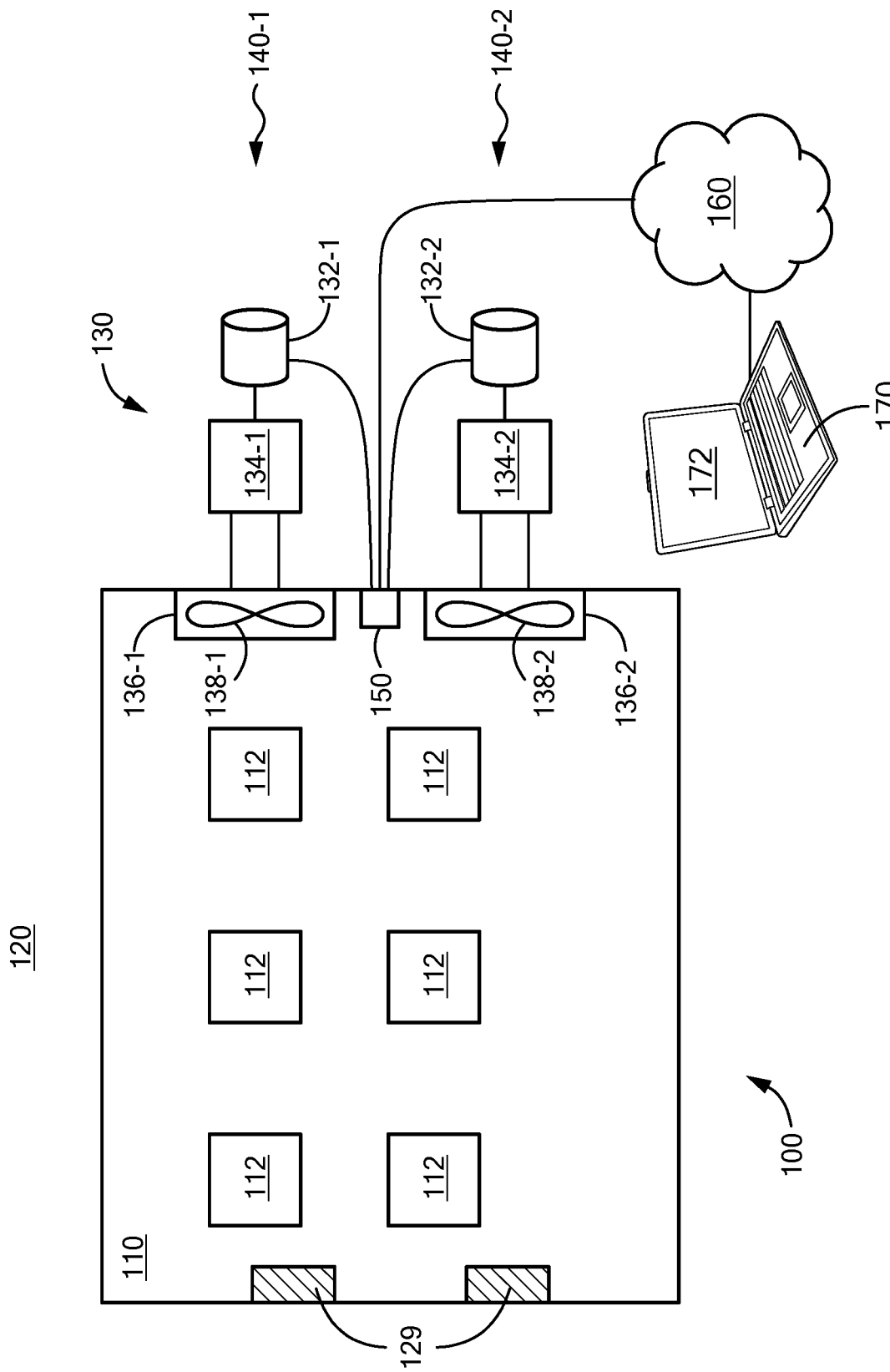
FIG. 1 is a plan view of an enclosure suitable for use with configurations herein.

The conventional control schemes as discussed above may operate sufficiently to control HVAC systems under predictable, optimal conditions; but can present problems when the deployed system not have sufficient cooling capacity to cool the space under all conditions; whether because they are under-sized or have become compromised for any reason. In such situations, the control system can require HVACs to run for extended periods or cycles which can cause unwanted strain that can lead to HVAC failures. Lead/Lag arrangements can cause similar stresses if unbalanced. Some controllers attempt to reduce the strain on HVACs by adding another staging condition that will start running additional HVACs if the temperature in the space has not satisfied the controller setting before a set (or user defined) period of time. For example, if the lead HVAC has run for 2 hours continuously and the temperature in the space has not dropped to or below the temperature at which the control system would turn OFF the HVAC, then an additional HVAC would be called to run to supplement the cooling of the running HVAC(s) until the control system is satisfied. This has the effect of shortening the duty cycle of the lead HVAC so that it will not run itself to failure. However, it can result in short duty cycles for the staged HVAC unit, further increasing equipment stresses.

An approach disclosed herein, in contrast, modifies the control settings to optimize the performance of the HVAC(s) deployed at a site and minimize the strain on the unit(s). In the disclosed approach, the ON temperature is lowered and/or the OFF temperature is raised such that the HVAC unit(s) called to run will be able to satisfy the controller within a fixed or user-defined period of time. This will still allow the control system to maintain an average or typical temperature in the space being cooled that is consistent with the originally specified acceptable temperature range. It may be further helpful to note that, in contrast to occupied conditioned spaces that typically vasilate around a single thermostatic setpoint due to human temperature sensitivity, machine rooms may operate within a range, and allowed to "heat up" and "cool down" within that range without compromise.

In the examples below, modification of the control settings may change automatically based upon the actual performance of the HVAC. Should the HVAC called to run require longer than a fixed or user-defined period of time to satisfy the controller, the settings may be modified to reduce the time required to operate. This could be done dynamically during the current run cycle or could be changed such that the control settings for that HVAC are changed for the next run cycle of the HVAC. The settings could be multi-staged (also by fixed or user-defined amounts) to optimize the run time of the HVAC. The converse also applies. If the time to satisfy the controller be less than a desired or expected period, then the control settings would increment to extend the run time of the HVAC to reduce short cycling of the compressor. This control configuration would allow the system to adapt to changes in thermal load, solar load and HVAC cooling capacity that may occur over time and throughout the course of a day and would help minimize unnecessary strain on HVAC systems. This modification of settings with a user-defined range could be implemented separately or in conjunction with conventional thermostatic values.

FIG. 1 is a plan view of an enclosure suitable for use with configurations herein. In an equipment enclosure 100, a conditioned environment 110 exists surrounding electronics, telecommunications, and other computing equipment 112. The conditioned environment 110 maintains temperature and humidity independently from an outside ambient environment 120 through invocation of an HVAC system 130. A controller 150 for the HVAC system 130 provides temperature and humidity control through compressors 132-1 . . . 132-2 (132 generally), condensers 134-1 . . . 134-2 (134 generally), evaporators 136-1 . . . 136-2 (136 generally) (also called heat exchangers) and fans 138-1 . . . 138-2 (138 generally). Heating may also be provided, depending on the nature of the ambient environment 120, to which the principles discussed herein are equally applicable.

Evaporators 136 may pass recirculated or fresh air, optionally in conjunction with exhaust vents 129. It is common for multiple sets of compressors 132, condensers 134, evaporators 136 and fans 138, collectively referred to as cooling units 140-1 . . . 140-2 (140 generally) to service an enclosure 100, for redundancy, load sharing and equipment longevity. Cooling units 140 are preferably designed to reasonably accommodate expected temperature extremes, however unforeseen and overlooked factors, such as electronic equipment upgrade, overcrowding, and equipment age tend to force the cooling units 140 to operational extremes, for which configurations herein are intended to mitigate.

The controller 150 switches the cooling systems 140 on and off, typically through compressor control. Temperature sensors relay the ambient temperature, however the cooling cycle timing as discussed further below mitigates the need for numerous sensors in multiple locations. Remote access is usually provided for GUI (Graphical User Interface) 172 access to the timing setpoints and thresholds via a public access network 160 connecting a user device 170.

During operation, conventional approaches simply cycle the cooling systems on and off according to simple thermostatic control, as in a dwelling. Such control makes no account of cycle time—the amount of time the cooling unit 140 is powered on and activated and the amount of time it is powered off and idle. Short cycling, or an excessive number of on/off cycles, increases equipment strain and shortens longevity. Similarly, extended activation cycles where the cooling unit 140 is "struggling" to achieve a temperature change, also causes undue strain. Configurations herein incorporate cycle time in the control of the cooling unit for maintaining a target temperature range, and dynamically modify temperature setpoints that determine activation and deactivation of the cooling units.

Figure 2:
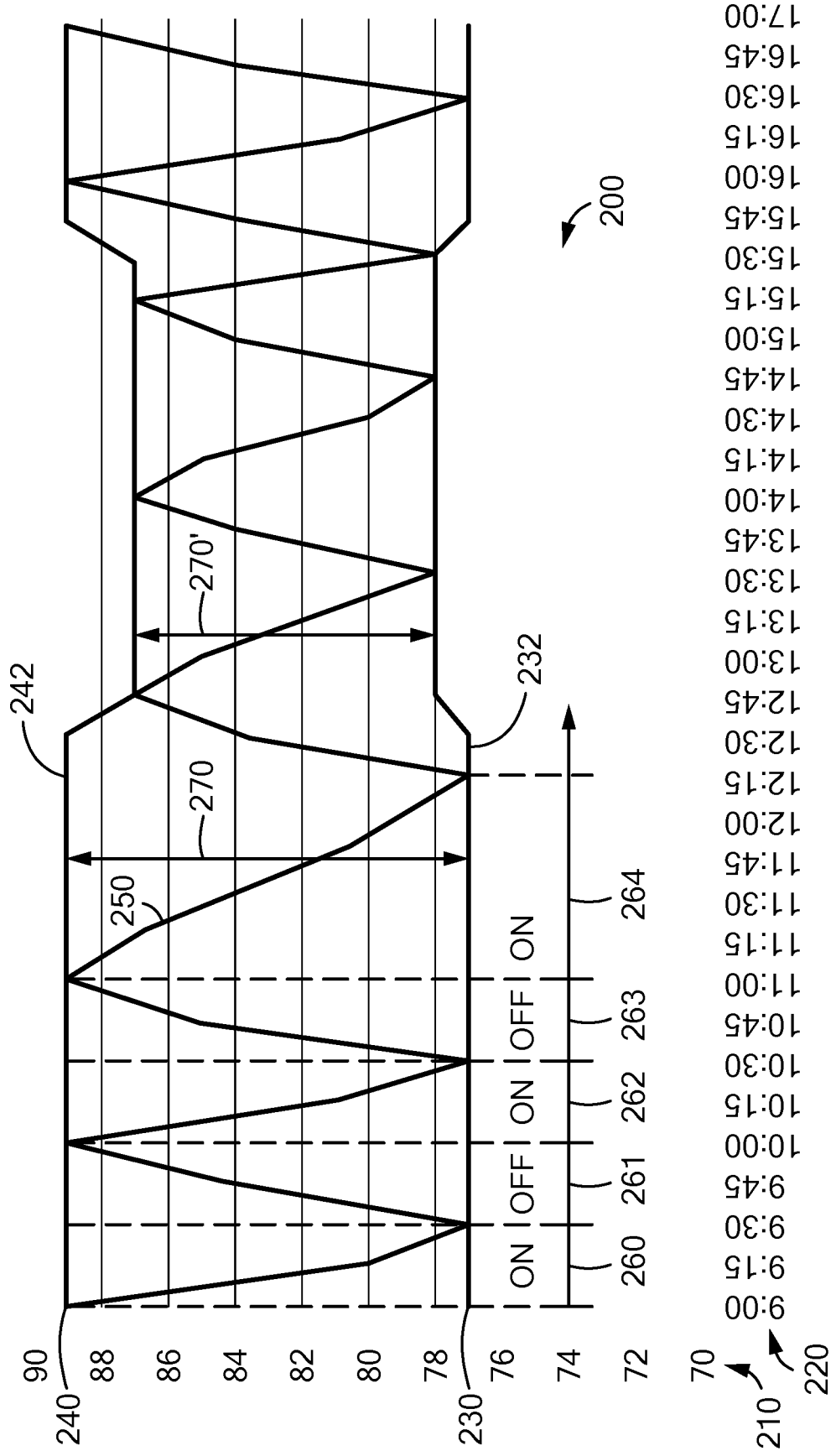
FIG. 2 is a graph of operating bands in the enclosure of FIG. 1.

FIG. 2 is a graph of operating bands in the enclosure of FIG. 1. Referring to FIGS. 1 and 2, FIG. 2 shows a graph 200 of temperature 210 (vertical axis) to time 220 (horizontal axis). A power-on setpoint 240 is defined by a cooling demand threshold (line 242), and a power-off setpoint 230 is defined by a cooling satisfaction threshold (line 232). An enclosure temperature 250 shows the temperature of the conditioned environment 110.

When the enclosure temperature 250 meets the cooling demand threshold 242, the cooling unit 140 is activated and powered on to commence an "on" cycle. The temperature 250 falls as cooling continues until reaching the cooling satisfaction threshold 232, defining a lower bound, and the cooling unit is powered off and deactivated. An "off" cycle 261 commences and temperature rises until again attaining the cooling demand threshold 242. "On" cycles 260, 262, 264 alternate with "off" cycles 261, 263 as the temperature swings between the setpoints defined by the current cooling demand (upper) 242 and satisfaction (lower) 232 thresholds. The time, or cycle frequency during the "on" and "off" cycles determines the powered on/off cycle time.

The approach disclosed herein provides power cycling for achieving operational temperatures according to dynamic setpoints defined by the demand and satisfaction thresholds 242, 232. The controller 150 sets a timer (axis 220) when a cooling unit 140 is powered on in response to a setpoint 240, and determines a time when the cooling unit is powered off in response to a setpoint 230. The difference between the times determines the on/off cycle 260. Comparison with a corresponding timer indicates whether the thresholds 242, 232 should be adjusted based on cycle times exceeding corresponding timers. The controller 150 adjusts at least one of the setpoints based on a difference between the powered-on time and the powered-off time.

Extending from termination of the power-on cycle 260, a powered off cycle 261 is shown below the upward slope of line 250. The controller 150 determines a duration of the powered-on cycle 260 for achieving a setpoint, and determines a duration of a powered-off cycle 261 for achieving a setpoint. The controller then modifies at least one of the setpoints based on a computed difference between the powered-on cycle or the powered-off cycle and the respective timers. Ideally, on and off cycles would be approximately equal in a balanced system running at an average load. Ambient conditions may not permit this, however, by observing required time to cool down can be used to lower the demand setpoint to engage sooner on successive cycles, and in a multi-cooling unit setup this dynamic adjustment may be extended to other cooling units as well.

Figure 3:
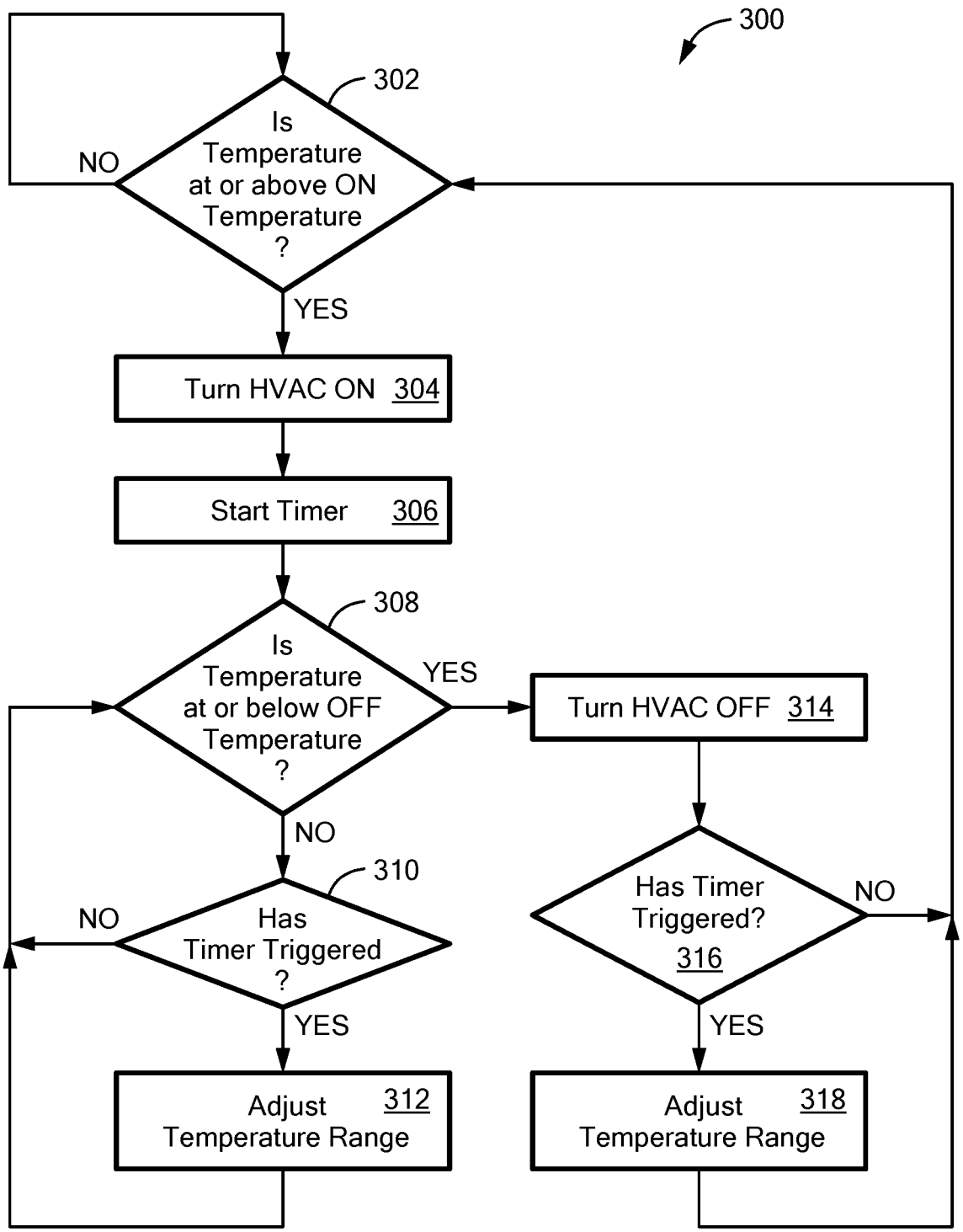
FIG. 3 is a flowchart for operating according to the bands of FIG. 2.

Continuing to refer to FIG. 3, the thresholds 232, 242 effectively define a dynamic series of setpoints. The plurality of setpoints correspond to the cooling demand threshold 242 and the cooling satisfaction threshold 232 such that a difference between the cooling demand threshold and the cooling satisfaction threshold defines a band 270 of operational range. The band 270 is the temperature range between the thresholds, which the controller 150 dynamically modifies based on the cycle 260-264 duration.

Since the band is a relative temperature difference, the controller 150 may modify the band by increasing or decreasing at least one of the setpoints 240, 230 defining the cooling demand threshold 242 or cooling satisfaction threshold 232. Stated graphically, the bottom threshold may be "moved up" or the top threshold "moved down." A reduced band 270' exhibits both.

In operation, the controller 150 may determine that the cooling unit 140 is operating for an excessive duration of powered-on time, and narrow the band 270 for reducing a duration needed to achieve the cooling satisfaction threshold. Narrowing the band will allow the cooling satisfaction threshold to be reached sooner, avoiding extended running times. Similarly, the controller 150 may determine that the cooling unit is operating for a short interval of powered-on time, and widen the band 270 for increasing a duration needed to achieve the cooling satisfaction threshold 232, thus preventing short cycling. If overall reduced run time is called for, both thresholds could be increased to accept a slightly higher temperature 110 in the enclosure. Similarly, if cooling demand is low, the operational temperature 110 may be reduced to enjoy cooler operating temperatures since the equipment is not being stressed anyway and may benefit from avoiding short cycling.

FIG. 3 is a flowchart 300 for operating according to the bands of FIG. 2. Referring to FIGS. 1-3, an example operating scenario may be fulfilled according to control logic as in FIG. 3. At step 302, the control logic in the controller enters a loop and determines if the temperature in conditioned environment 110 is at or above the "on" temperature defined by the cooling demand threshold 242. This corresponds to an upward slope of the graph 250 as the cooling unit 140 is disengaged. If not, control reverts to periodically perform the check at step 302. The cooling unit 140 is powered on at step 304, as the setpoint 240 presently defined by the threshold 242 is reached. A timer commences to measure the interval 260, as depicted at step 306, and cooling continues pending the check at step 308.

Periodically, a check is performed to determine when the temperature in the conditioned environment 110 attains the setpoint 230 defined by the current cooling satisfaction threshold 232. The timer represents a quantum of time expected to reach the satisfaction threshold 232, based on user input and previous cycles. Multiple timers may be set, for example a minimum amount of time to sufficiently cool and a maximum amount of time required to attain sufficient cooling. Concurrently or sequentially, a check is performed to determine if a maximum cooling timer has expired, at step 310. This represents a maximum time interval to attain the cooling satisfaction threshold 232. If the timer has not yet expired, and since the satisfaction threshold (OFF) temperature has not yet been reached, control reverts to step 308, If the timer has triggered at step 310, since the OFF temperature has not been reached, then the thresholds are adjusted accordingly, as depicted at step 312. Since the timer 310 has triggered before cooling satisfaction threshold 232 is attained, cooldown has taken excessively long and the controller 150 adjusts the range of the band 270, at step 312. It can be visually observed on the graph of FIG. 2 that a band decrease will "compress" the graph 250 and result in decreased cycle times, while broadening the band has an opposite effect.

The timer check at steps 310 and 316 are generally for determining if the cooling unit has an excessive cycle time for either powered-on or powered-off cycles, in which the powered-on time and powered-off time are inversely related. This may result in either decreasing the band for reducing the duration of cycles, or increasing the band for increasing the duration of cycles. Timer values are compared to threshold settings, and the width of the band 270 modified by changing one or both of the thresholds 232, 242.

In either a powered-on/cooldown state or a powered-off idle state, the controller may set one or more timers upon commencing a powered on or powered-off cycle of the cooling unit. Upon expiration of the timer, the controller determines if the cooling demand threshold or the cooling satisfaction threshold has been attained, and modifies at least one of the cooling demand threshold or the cooling satisfaction threshold if the timer expired before attaining the threshold. Note that setting a time may simply be performed by recording a time of attaining the threshold and periodically comparing the current time to a parameter of the expected minimum and maximum intervals (260-264).

Another check is periodically performed, at step 316, to determine overly rapid cooldown. Upon attaining the cooling satisfaction threshold 232, and turning the cooling unit 140 off at step 314, a check is performed to determine if a timer has expired for excessively rapid cooldown. In the case of a rapid cooldown, leading to short cycling, generally either the satisfaction threshold 232 is lowered or the demand threshold raised to broaden the band and increase the duration of the cooling cycle 230. If the timer 316 has not expired, then operation is within normal threshold timer limits and control reverts to step 302. In the case of an excessive time to achieve cooldown, generally either the satisfaction threshold 232 is raised or the demand threshold lowered to narrow the band and decrease the duration of the cooling cycle 230.

It should be noted that the setpoints 230, 240 referred to above apply equally to any setpoint defined by the demand threshold 242 and satisfaction threshold 232 and the peaks and valleys of the current temperature 250.

There are other factors which may affect the cooling logic. The HVAC system 130 may include a plurality of cooling units 140-1, 140-2, resulting in a determination that one of the cooling units is operating in a powered-on or powered-off state longer than other cooling units of the plurality of cooling units. In response, the controller 150 may adjust the band corresponding to the determined cooling unit for reducing the powered-on or powered-off state. In other words, a history of cycle duration for multiple cooling units 140 may be analyzed, and a cycle anomaly in one cooling unit 140-1 may result in a threshold change for another cooling unit 140-2.

Other factors include an aged cooling unit or compressor, where efficiency is less than optimal and avoiding equipment stress from excessive runtime is a concern. In such a case, the controller receives a determination that the cooling unit has a reduced efficiency, either from the user interface 172 or from a history of extended run cycles. The controller 150 increases the band 270 by at least one of reducing the cooling demand threshold or increasing the cooling satisfaction threshold for reducing a frequency of power cycles.

Another equipment tuning operation includes accommodating waves of excessive ambient temperature. An increase in ambient temperature 120 requires the cooling units 140 to absorb the additional temperature degrees. In such a case, the controller 150 may receive a determination of an excessive ambient temperature, and decrease the cooling demand threshold for providing a powered-on state at a lower temperature. This may result in accepting a slightly elevated conditioned space temperature 110, or widening the band to increase cycle duration, rather than turning the cooling units 140 back on shortly after a power off due to a rapid temperature rise.

Although the controller attempts to modify cycle time by broadening and narrowing the operating band 270, problems requiring manual intervention may of course occur. In such a case, the controller will determine a substantial difference in the computed powered-on or powered off time based on previous computed differences, meaning a sudden spike or dip in cycle time that goes beyond expected ambient variations. A failure in a part of the cooling system may be a cause, or possible a maintenance operation has left a door or vent open. The controller then triggers an alarm indicative of the excessive difference in time for the temperature to traverse the band.

Referring again to FIG. 1, the operation according to FIGS. 2 and 3 may be implemented by a suitable circuit or electronics operable for engaging the cooling units 140 by relays, transistors, or other switching. Typically switching is performed on the compressor driving the cooling units, but other switching or activation mechanisms may be performed. In the example arrangement, these operations are performed by the controller 150.

The controller 150 disposed in the enclosure for operation as discussed above includes electric circuits, power connections, memory and processor capability, including a powered-on timer for storing a time a cooling unit is powered on, and a powered-off time for storing a time a cooling unit is powered off. A demand setpoint stores a temperature corresponding to a cooling demand threshold, and a satisfaction setpoint stores a temperature corresponding to a cooling satisfaction threshold. Control logic computes and stores a difference between the powered-on time and the powered off time, along with respective timers, and controls one or more switches, relays or interfaces for powering the cooling unit in response to a received enclosure temperature and the computed difference.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In an environmentally controlled enclosure having HVAC units responsive to power cycling for achieving operational temperatures defined by a plurality of setpoints, a method of regulating environmental conditions in the enclosure, comprising:
   determining a time when a cooling unit is powered on in response to a demand setpoint defined by a cooling demand threshold;
   determining a time when the cooling unit is powered off in response to a satisfaction setpoint defined by a cooling satisfaction threshold;
   determining a duration of a powered-on cycle for achieving the satisfaction setpoint;
   determining a duration of a powered-off cycle for achieving the demand setpoint and
   adjusting at least one of the satisfaction or demand setpoints based on a computed difference between the duration of the powered-on cycle and the powered-off cycle, a difference between the cooling demand threshold and the cooling satisfaction threshold defining a band of operational range.

2. The method of claim 1 further comprising:
   modifying the band of operational range by increasing or decreasing at least one of the setpoints defining the cooling demand threshold or cooling satisfaction threshold.

3. The method of claim 1 further comprising:
   determining that the cooling unit is operating for an excessive duration of the powered-on cycle; and
   narrowing the band of operational range for reducing a duration needed to achieve the cooling satisfaction threshold.

4. The method of claim 1 further comprising:
   determining that the cooling unit is operating for a short interval of the powered-on cycle; and
   widening the band of operational range for increasing a duration needed to achieve the cooling satisfaction threshold.

5. The method of claim 1 further comprising:
   setting a timer upon commencing the powered-on cycle or powered-off cycle of the cooling unit;
   upon expiration of the timer, determining if the cooling demand threshold or the cooling satisfaction threshold has been attained; and
   modifying at least one of the cooling demand threshold or the cooling satisfaction threshold if the timer expired before attaining the threshold.

6. The method of claim 1 further comprising:
determining that the cooling unit has an unbalanced cycle time between powered-on and powered-off cycles, the powered-on cycle duration and powered-off cycle duration being inversely related; and
decreasing the band for reducing the duration of powered-on cycle; or
increasing the band for increasing the duration of powered-off cycle.

7. The method of claim 1, further comprising:
setting a timer based on the cooling unit powered-on time;
receiving an indication that the timer has expired;
determining if the cooling unit is powered on or off based on a corresponding cooling satisfaction threshold; and
adjusting either the demand or satisfaction off setpoints based on the determination.

8. The method of claim 1 further comprising:
setting a timer corresponding to an excessively long cooldown;
receiving an indication that the timer has expired;
determining if the cooling satisfaction threshold has been attained; and if not, adjusting the band to reduce a length of the powered-on cooldown cycle.

9. The method of claim 1 further comprising
setting a timer corresponding to a rapid cooldown;
receiving an indication that the timer has expired;
determining if the cooling satisfaction threshold has been attained; and if so, adjusting the band to increase a length of the powered-on cooldown cycle.

10. The method of claim 1 wherein the cooling unit includes a plurality of cooling units, further comprising:
determining that one of the cooling units is operating in a powered-on or powered-off state longer than other cooling units of the plurality of cooling units;
adjusting the band corresponding to the determined cooling unit for reducing the powered-on or powered-off state.

11. The method of claim 1 further comprising:
receiving a determination that the cooling unit has a reduced efficiency; and
increasing the band by at least one of reducing the cooling demand threshold or increasing the cooling satisfaction threshold for reducing a frequency of power cycles.

12. The method of claim 1 further comprising:
receiving a determination of an excessive ambient temperature; and
decreasing the cooling demand threshold for providing a powered-on state at a lower temperature.

13. The method of claim 1 further comprising:
determining a substantial difference in the computed powered-on or powered off time based on previous computed differences; and
triggering an alarm indicative of the excessive difference for the temperature to traverse the band.

14. The method of claim 1, further comprising
controlling a cooling unit by activating the cooling unit based on a time needed to effect a quantum of a temperature change in the enclosure during a previous measured interval of activation defined by the powered-on cycle and powered-off cycle.

15. The method of claim 14 wherein the quantum of temperature change is defined by a cooling demand threshold and a cooling satisfaction threshold in the equipment enclosure.

16. The method of claim 1 further comprising:
comparing a duration of the powered-on cycle to a timer value;
determining if the duration of the powered-on cycle exceeds the timer value, and if so,
narrowing the band of operational range by reducing the cooling demand threshold or increasing the cooling satisfaction threshold; and
if not,
concluding that the duration of the powered-on cycle was too short, and
broadening the band of operational range by increasing the cooling demand threshold or decreasing the cooling satisfaction threshold.

17. A HVAC controller, comprising:
a powered-on timer for storing a time a cooling unit is powered on;
a powered-off timer for storing a time a cooling unit is powered off;
a demand setpoint for storing a temperature corresponding to a cooling demand threshold;
a satisfaction setpoint for storing a temperature corresponding to a cooling satisfaction threshold;
control logic for:
computing and storing a difference between the powered-on cycle and the poweredoff cycle;
determining a duration of a powered-on cycle for achieving the satisfaction setpoint;
determining a duration of a powered-off cycle for achieving the demand setpoint; and
adjusting at least one of the satisfaction or demand setpoints based on a computed difference between the duration of the powered-on cycle and the powered-off cycle,
a difference between the cooling demand threshold and the cooling satisfaction threshold defining a band of operational range; and
a switch for powering the cooling unit in response to a received enclosure temperature and the computed difference.

* * * * *